United States Patent [19]

Watson

[11] 4,231,705
[45] Nov. 4, 1980

[54] HELICOPTER ROTOR

[75] Inventor: Kenneth Watson, Yeovil, England

[73] Assignee: Westland Aircraft Limited, Yeovil, United Kingdom

[21] Appl. No.: 940,481

[22] Filed: Sep. 7, 1978

[30] Foreign Application Priority Data

Sep. 7, 1977 [GB] United Kingdom .............. 37426/77

[51] Int. Cl.³ ............................................. B64C 27/72
[52] U.S. Cl. .............................. 416/108 R; 416/114; 416/141; 416/168 R
[58] Field of Search .................. 416/114, 108, 134 A, 416/138 A, 140, 141, 167, 168, 131 A, 140 A, 170 R

[56] References Cited

U.S. PATENT DOCUMENTS

| 1,921,805 | 8/1933 | Bordoni | 416/131 A X |
|---|---|---|---|
| 2,086,803 | 7/1937 | Hays | 416/108 |
| 2,487,953 | 11/1949 | Sznycer | 416/113 X |
| 2,493,869 | 1/1950 | Hafner | 416/140 A X |
| 2,663,371 | 12/1953 | Magill | 416/168 X |
| 3,303,888 | 2/1967 | Wolf | 416/144 |
| 3,790,301 | 2/1974 | Pedersen et al. | 416/108 |
| 4,080,098 | 3/1978 | Watson | 416/138 A X |
| 4,139,331 | 2/1979 | Girodin | 416/140 A X |

FOREIGN PATENT DOCUMENTS 648814 8/1937 Fed. Rep. of Germany .......... 416/108
521552 7/1921 France ..................................... 416/168

Primary Examiner—Everette A. Powell, Jr.
Attorney, Agent, or Firm—Larson, Taylor and Hinds

[57] ABSTRACT

This invention is concerned with helicopter rotor control systems which hitherto have tended to comprise complex assemblies which are costly to manufacture and maintain and which are vulnerable to external damage.

A helicopter rotor is disclosed in which each of a plurality of radially extending rotor blades is attached to the outer end of an individual spindle 19 having its inner end protruding into the interior of a hollow rotor hub structure 12 and supported by bearing means 21 arranged to permit rotational movement of the spindle 19 about its axis. A pitch control lever 22 is attached to the inner end of each spindle 19 and is articulated, through a universal joint, to the upper end of an individual connecting rod 38, 39, 40 and 41, the lower ends of the connecting rods being attached to a common housing 42 having independently rotatable means for connection to helicopter flying controls.

6 Claims, 4 Drawing Figures

HELICOPTER ROTOR

DESCRIPTION OF INVENTION

This invention relates to helicopters, and particularly to helicopter rotors.

Helicopter rotor control systems often include an externally mounted swash plate mechanism through which control movements are transmitted to the rotor blades through a pitch link rod connected to a pitch control lever on each rotor blade. Such systems are complex and costly to manufacture and maintain and, due to their external siting, are vulnerable to damage.

Another known system includes a control column housed within a hollow drive shaft so as to protrude from an upper end thereof for connection to the rotor blades through a spider mechanism and connecting links. In order to cater for blade lead and lag movements encountered during operation, the arms of the spider are articulated to the control column so as to be capable of independant rotational movements about the column axis and as a result the control column has to be supported within the hollow shaft so as to provide a positive fulcrum about which it can be tilted to impart cyclic pitch changes to the blades. Additionally, provision has to be made for axial movements of the fulcrum to impart collective pitch changes to the blades. Thus in this system the control column is usually supported on a bearing such as a spherical bearing or trunnion type universal bearing to allow tilting of the spider to effect cyclic pitch changes, and on axial splines to effect vertical movement of the spider to adjust the collective pitch setting of the blades.

This latter system is also complicated to manufacture, and is difficult to service and repair by reason of having parts buried within the hollow shaft, which often extends through a gearbox thereby adding further complications in this respect. Also, important parts of this control system are located externally of the rotor hub, and therefore vulnerable to damage.

Accordingly, the present invention provides a helicopter rotor including a hollow rotor hub arranged for rotation about an axis and a plurality of rotor blades extending radially of said axis, each blade being attached to the outer end of an individual spindle having its inner end protruding into the interior of the hollow rotor hub and supported by bearing means within the hub arranged to permit rotational movement of the spindle about its axis to change the pitch of its associated blade, the inner end of each said spindle having a pitch control lever articulated, through a universal joint, to the upper end of an individual connecting rod, lower ends of the connecting rods being attached to a common housing having independantly rotatable means for connection to helicopter flying controls.

The connecting rods may extend downwardly and inwardly to attachments to the common housing. Preferably one of the connecting rods is fixedly attached to the housing to stabilise the control assembly and the remaining connecting rods may be attached to the housing through universal joints. Conveniently, the said one connecting rod is formed integral with the housing.

The housing may have a hollow portion having a downwardly facing open end, and a spigot may be carried in bearings secured in the hollow portion and may have a protruding lower end provided with universal joint means for attachment to the helicopter flight control system.

Each pitch control lever may have a bifurcated portion at its outer end for attachment of its associated connecting rod. Preferably, said bifurcated portions are angled so that their centrelines intersect at a common centre.

Conveniently, the hollow rotor hub may be attached to an annular ring gear rotationally mounted in a gearbox and meshed with at least one pinion gear connected to a power source, the connecting rods extending downwardly through the centre of the ring gear to the common housing which is located, preferably, below the gearbox thereby reducing the overall height of the assembly and facilitating the attachment to the helicopter controls.

The invention will now be described by way of example only and with reference to the accompanying drawings in which.

Figure 1:
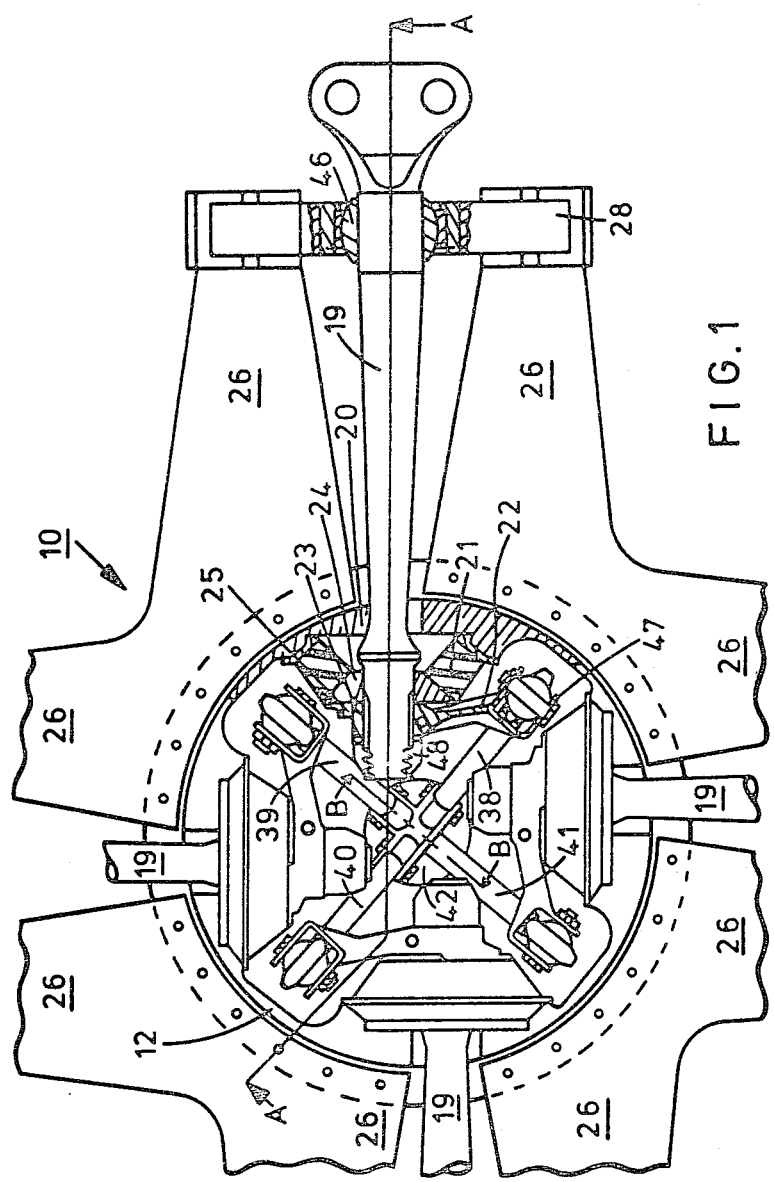
FIG. 1 is a fragmentary part sectioned plan view of a helicopter rotor embodying the invention.
Figure 2:
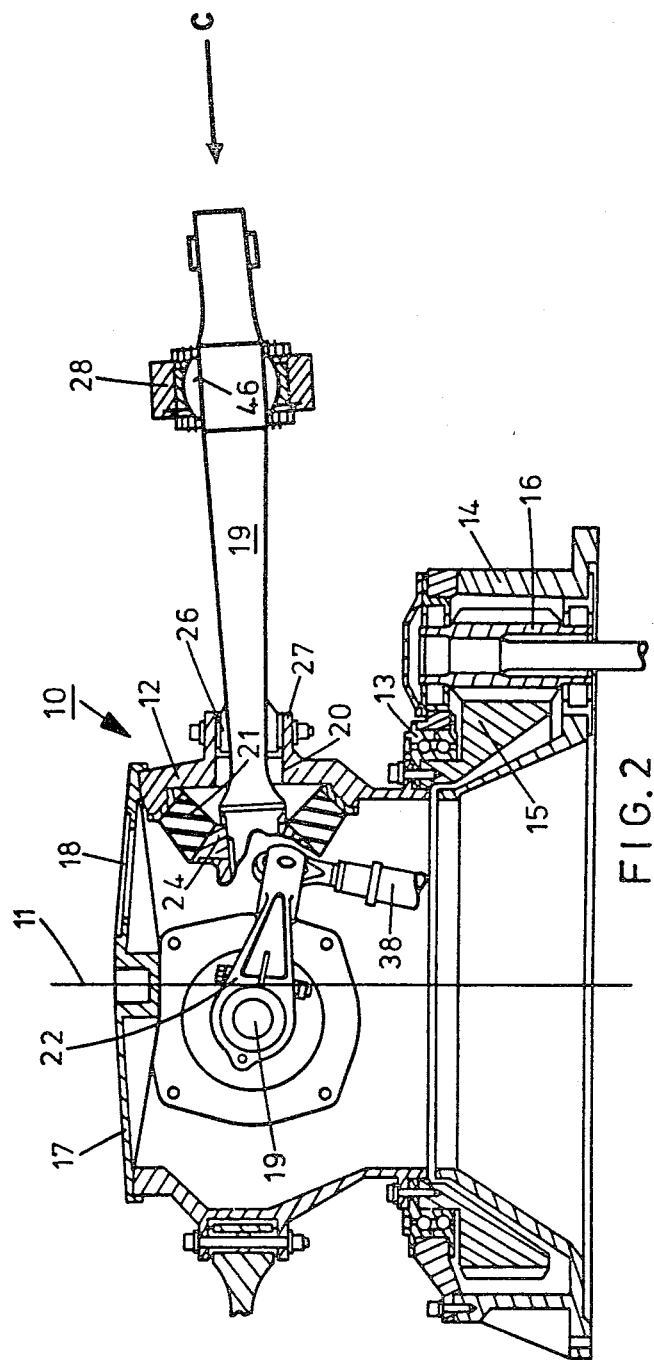
FIG. 2 is a fragmentary part sectioned view taken on line A—A of FIG. 1.

The four-bladed helicopter rotor illustrated in the drawings includes a rotor hub generally indicated at 10 and arranged for rotation about a generally vertical axis 11.

The rotor hub 10 comprises a hollow hub structure 12 supported in a bearing 13 in a gearbox 14. An annular ring gear 15 is bolted to the hub structure 12 and is provided with conformal gear teeth arranged to mesh with a plurality of pinion gears 16 (only one of which is shown) supported in the gearbox and connected to one or more power sources (not shown). An opening in the upper surface of the hub structure 12 is closed by a cover plate 17 provided with four transparent windows 18.

Each of the rotor blades (not shown) is attached to the outer end of an associated, generally radially extending, spindle 19 which protrudes through an aperture 20 in the wall of the hub structure 12 into the interior thereof. The inner end of the spindle 19 is supported in a conical elastomeric bearing 21 fixed to the inner surface of the hub structure 12 around the aperture 20.

An individual pitch control lever 22 is fixed to the inner end of each spindle 19, within the rotor hub structure 12, on splines 23, and is also fixed to an inner support 24 of the bearing 21 by a dowel 25. The pitch control lever 22 is retained by a nut threaded onto the inner end of the spindle 19, and extends generally perpendicularly to the longitudinal axis of the spindle 19 for a purpose to be described.

An arm assembly extending outwardly from the rotor hub structure 12 is associated with each of the radially extending spindles 19. In the illustrated embodiment, each arm assembly comprises a pair of generally flat arms 26 constructed of fibre-reinforced plastics material disposed one on each side of the associated spindle 19 in the plane of rotation of the spindle 19 and spaced-apart from the surfaces thereof. The arms are flexible in a plane perpendicular to the plane of rotation, i.e. the rotor blade flapping plane.

Adjacent arms 26 of adjacent pairs of arms are manufactured as an integral assembly and bolted between radially extending flanges 27 formed around the periphery of the hollow hub structure 12.

A dry spherical bearing 46 is located on each spindle 19 slightly inboard of the outer end thereof and so as to be capable of sliding movement on the spindle, and is supported in a bearing housing 28 having outwardly facing U-shaped end portions 29 arranged to straddle the outer ends of the associated pair of arms 26.

Elastomeric damper units 30, each comprising a bonded assembly of alternate layers of elastomer and metal shims bonded to inner and outer metal liners 31 and 32, are located between facing surfaces of the U-shaped portions 29 and of the arms 26. The layers in the units 30 are oriented in the plane of rotation of the rotor. In the illustrated embodiment, each inner liner 31 is provided with a protrusion 33 located in a mating hole 34 in a plate member 35 which has flanged edge portions located on the extremities of the arm 26 and the respective damper unit 30. The outer liner 32 has a protruding laterally extending boss 36 that is located in a mating slot 37 formed in the inner surface of the U-shaped portion 29 of the bearing housing 28.

Each pitch control lever 22 has a bifurcated portion 47 at its outer end which is angled so that the centreline of the four bifurcated portions 47 intersect at a common centre.

Figure 3:
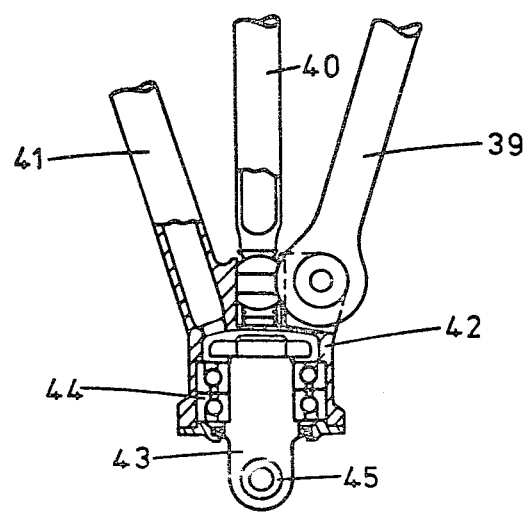
FIG. 3 is a fragmentary part sectioned view taken on lines B—B of FIG. 1.
Figure 4:
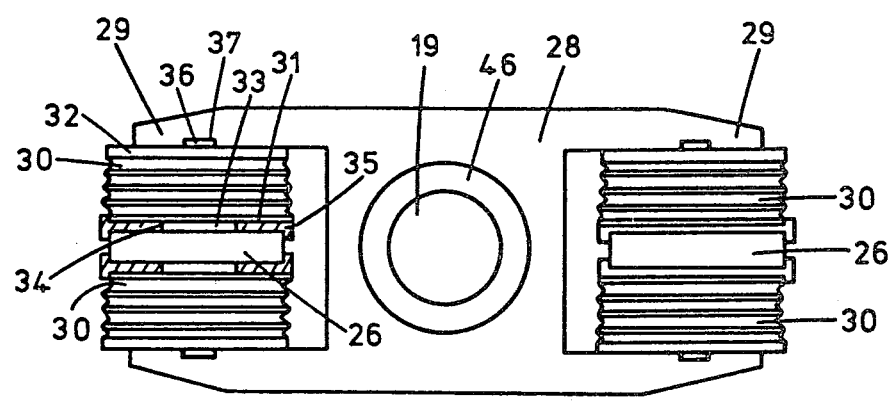
FIG. 4 is a part sectioned view in the direction of arrow C on FIG. 2.

The upper ends of four connecting rods 38, 39, 40 and 41 are attached through ball joints to the bifurcated ends 47 of the pitch control levers 22. The connecting rods 38, 39, 40 and 41 extend downwardly and inwardly through the annular ring gear and have their lower ends attached to a housing 42 (FIGS. 1 and 3) located below a lower surface of the gearbox. The connecting rod 41 is formed integral with the housing 42, whereas connecting rods 38, 39 and 40 are attached by ball joints to flanges formed integral with the housing 42.

The housing 42 includes a hollow lower portion having a downwardly facing lower end. The hollow portion supports a downwardly extending spigot 43 in bearings 44 so that the spigot 43 is capable of rotation relative the housing 42. A lower end of the spigot 43 is provided with a ball joint 45 for attachment to the helicopter flying controls (not shown).

In operation, the pinion gears 16 are rotated through a transmission system by the power source(s) to rotate the annular ring gear 15 and attached hollow hub structure 12 about the axis of rotation 11. The housing 42 rotates about the spigot 43 to permit the connecting rods 38 to 41 to follow this rotation of the rotor.

Vertical movement of the housing 42 (FIG. 3) by the helicopter controls is transmitted through the control rods 38, 39, 40 and 41 to each pitch control lever 22 to rotate the spindles 19 about their respective axes, this rotation being permitted by the elastomeric bearings 21 and serving to adjust the collective pitch setting of rotor blades attached at outer ends of the spindles 19. A lateral movement imparted to the housing 42 in any desired direction by the helicopter flying controls causes varying degrees of rotation of the spindles 19 as the rotor hub 10 is rotated about axis 11, to cause cyclic pitch changes of the rotor blades thereby imparting desired control movements to the helicopter.

The rigid attachment of the lower end of control rod 41 to the housing 42 serves to stabilise the control system, and lateral shear forces caused by movements of the rotating rotor blades are reacted at the pitch control levers 22.

Apart from facilitating blade pitch change movements as above described, the elastomeric bearings 21 serve also to transmit centrifugal forces from the rotating rotor blades to the hollow rotor hub structure 12 via the spindles 19. Blade flapping movements due to changes in collective or cyclic pitch are accommodated by resilient flexing of the support arms 26, and rotor blade lead and lag movements are accommodated by shear movements in the elastomer layers in elastomeric damper units 30.

The dry spherical bearings 46 serve to isolate blade pitch changes from lead/lag movement, their ability to slide longitudinally of the respective spindles 19 serving to isolate blade pitch changes from flap movements.

Thus, in operation of the illustrated hingeless rotor, the flexible support arms 26 are not subjected to centrifugal forces and can, therefore, be designed to provide optimum stiffness in the blade flap plane totally independant of blade centrifugal force considerations. Similarly, the elastomeric damper units 30 are not subjected to centrifugal forces and can also, therefore, be designed to provide optimum requirements in the lead/lag plane by selection of elastomer having suitable hysteresis to provide, for example, any desired degree of damping.

This isolation of pitch, flap and lead/lag movements respectively also substantially eliminates undesirable pitch/flap and pitch/lag coupling phenomena during operation.

A further feature of the illustrated rotor is that, during operation, rotor blade flap and lead/lag movements result in bending of the spindles 19 which serves to prevent at least a proportion of such movements from being transmitted to the elastomeric bearings 21. In one particular embodiment, substantially all of the blade lead/lag movement is taken up by bending of the spindles 19 so that no inplane movements are transmitted to the bearings 21, and approximately one half of blade flap movement is taken up by bending of the spindles 19 so that about one half only of total blade flap movements are transmitted to the bearings 21. It is considered that the arrangement of the present invention will, in most cases, permit deflection of the bearings 21 due to blade flap and lead/lag movements to be reduced by a factor of at least two.

Therefore, because the elastomeric bearings 21 are required to provide substantially only for blade pitch change movements, being subject to only minor deflection by flapping and lead/lag movements, they can be of relatively small size, readily accommodated in the hub. The arrangement of each spindle 19 between a pair of spaced-apart support arms 26 serves to reduce the overall radial length of the rotor blade support structure and to minimise the profile presented in the direction of rotation, both features serving to reduce aerodynamic drag during operation.

Since the flexible arms 26 of the illustrated rotor are relieved of all operational centrifugal loads, their size is minimised and manufacture is simplified and inexpensive. Furthermore, the construction ensures that replacement of individual arms 26 is readily accomplished.

The illustrated control system requires no complex mechanical components such as swash plates or internal supports within the rotor drive shaft, thus being relatively inexpensive to manufacture and also of light weight and requiring minimal maintenance and servicing activity.

Furthermore, all the components of the control system are located within the hollow rotor hub and the drive shaft so that any possibility of damage by outside influences is eliminated. When utilised in combination with an annular final drive gear 15 as in the illustrated embodiment, the rotor of the invention enables the assembly comprising the rotor and gearbox to be of very small overall height, an important advantage in the design of helicopters required not to exceed a given overall height in that it permits achievement of the maximum cabin height dimension.

It will be understood that modifications can be made without departing from the scope of the invention as defined in the appended claims. For example, the elastomeric bearings 21 may be of any suitable configuration, e.g. part-spherical, instead of being conical as disclosed. The support arms 26 may be separately formed and may be individually attached to the hollow hub structure 12. Each of the connecting rods 38, 39, 40 and 41 may be formed as two parts pivotally interconnected at an intermediate pivotal connection to the free end of an arm the other end of which is pivotally attached to the interior surface of the rotor hub structure 12. Instead of lying entirely in the plane of spindles 19 as in the illustrated embodiment, the flexible arms 26 associated with each spindle 19 may slope upwardly from their outer attachment to the bearing housings 28 for attachment to an upper surface of the hub structure 12. In such an embodiment, the inboard area of each pair of arms 26 may, conveniently, be joined to comprise an integral assembly having a generally U-shaped outboard area to straddle the outer end of a respective spindle 19, and provide the attachment to the bearing housing 28. Such an arrangement, accompanied by suitable apertures in the wall of the hub structure 12, provides an alternative to the access provided by the cover 18 of the illustrated embodiment and will facilitate assembly and servicing, such as the adjustment of the control rods 38, 39, 40 and 41.

Although the invention has been described in relation to a fourbladed rotor, it will be understood that it is applicable to a helicopter having any number of rotor blades.

What I claim is:

1. A helicopter rotor including a hollow rotor hub arranged for rotation about an axis and a plurality of rotor blades extending radially of said axis, means attaching each blade to the outer end of an individual spindle, each said individual spindle having its inner end protruding into the interior of the hollow rotor hub and supported by bearing means within the hub arranged to permit rotational movement of the spindle about its axis to change the pitch of its associated blade, a respective pitch control lever coupled to the inner end of each said spindle, a plurality of connecting rods each articulated at its upper end, through a universal joint, to a respective one of said pitch control levers, the lower end of the connecting rods being attached to a common housing having independently rotatable means for connection to helicopter flying controls, one of said connecting rods being fixedly attached to said common housing, and the remaining connecting rods being attached to said common housing through universal joints.

2. A helicopter rotor as claimed in claim 1, wherein the connecting rods extend downwardly and inwardly to attachments to the common housing.

3. A helicopter rotor as claimed in claim 1, wherein said one connecting rod is formed integral with said housing.

4. A helicopter rotor as claimed in claim 1, wherein said housing includes a hollow portion having a downwardly facing open end, and a spigot carried on bearings secured in the hollow portion and having a protruding lower end provided with universal joint means for attachment to the helicopter flying controls.

5. A helicopter rotor as claimed in claim 1, wherein each pitch control lever has a bifurcated portion at its outer end for attachment of its associated connecting rod, said bifurcated portions being angled so that their centerlines intersect at a common center.

6. A helicopter rotor as claimed in claim 1, wherein said hollow rotor hub is attached to an annular ring gear rotationally mounted in a gearbox and meshed with at least one input pinion gear connected to a power source, said connecting rods extending downwardly through the centre of the ring gear to said common housing which is located below the gearbox.

* * * * *